United States Patent
Fukakusa et al.

(10) Patent No.: US 6,654,320 B2
(45) Date of Patent: Nov. 25, 2003

(54) OPTICAL PICKUP APPARATUS

(75) Inventors: Masaharu Fukakusa, Kobayashi (JP); Shogo Horinouchi, Fukuoka (JP); Shigeki Takeuchi, Yamaga (JP); Toshihiro Koga, Kumamoto (JP); Fuminobu Furukawa, Onojo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 380 days.

(21) Appl. No.: 09/783,045

(22) Filed: Feb. 15, 2001

(65) Prior Publication Data

US 2001/0043535 A1 Nov. 22, 2001

(30) Foreign Application Priority Data

Feb. 21, 2000 (JP) .................................. 2000-042276

(51) Int. Cl.⁷ .................................................. G11B 7/00
(52) U.S. Cl. ................. 369/44.14; 369/121; 369/112.28
(58) Field of Search .......................... 369/112.28, 44.23, 369/44.24, 121, 118, 112.09, 112.14, 112.21, 112.23

(56) References Cited

U.S. PATENT DOCUMENTS

| | | |
|---|---|---|
| 5,608,708 A | 3/1997 | Ophey |
| 5,712,841 A | 1/1998 | Opheij et al. |
| 5,783,818 A | 7/1998 | Manabe et al. |
| 5,790,502 A | 8/1998 | Horinouchi et al. |
| 5,978,344 A | 11/1999 | Horinouchi et al. |
| 6,014,359 A | 1/2000 | Nagano |
| 6,278,681 B1 | 8/2001 | Nagano |
| 6,529,454 B1 * | 3/2003 | Asoma et al. ......... 369/112.28 |

FOREIGN PATENT DOCUMENTS

| | | |
|---|---|---|
| JP | 2806293 | 6/1996 |
| JP | 927140 | 1/1997 |
| JP | 944890 | 2/1997 |
| JP | 9297935 | 11/1997 |
| JP | 10501089 | 1/1998 |
| JP | 1069671 | 3/1998 |
| JP | 10143915 | 5/1998 |
| JP | 11283271 | 10/1999 |
| JP | 11339309 | 12/1999 |
| JP | 200011432 | 1/2000 |
| JP | 200021008 | 1/2000 |
| JP | 2000 30285 | 1/2000 |
| JP | 200036117 | 2/2000 |
| JP | 2001101701 | 4/2001 |
| JP | 2001101703 | 4/2001 |
| JP | 2001195767 | 7/2001 |

OTHER PUBLICATIONS

Japanese Office Action dated Jan. 7, 2003 with English translation.

* cited by examiner

*Primary Examiner*—Nabil Hindi
(74) *Attorney, Agent, or Firm*—Stevens, Davis, Miller & Mosher, LLP

(57) ABSTRACT

A small-sized, inexpensive optical pickup apparatus can be assembled with high accuracy. The optical pickup apparatus has a various-purpose semiconductor laser, an integrated optical assembly for guiding outgoing light to an optical disk and for separating reflected light, a light receiver for receiving light and converting the received light into an electrical signal, and a coupling member for retaining a positional relationship among the various-purpose semiconductor laser, the integrated optical assembly, and the light receiver. By using a various-purpose semiconductor laser, the optical pickup apparatus can be made in a small size at low cost, and can be accurately assembled. The apparatus is also capable of accurately and efficiently detecting the optical power of the various-purpose semiconductor laser.

25 Claims, 11 Drawing Sheets

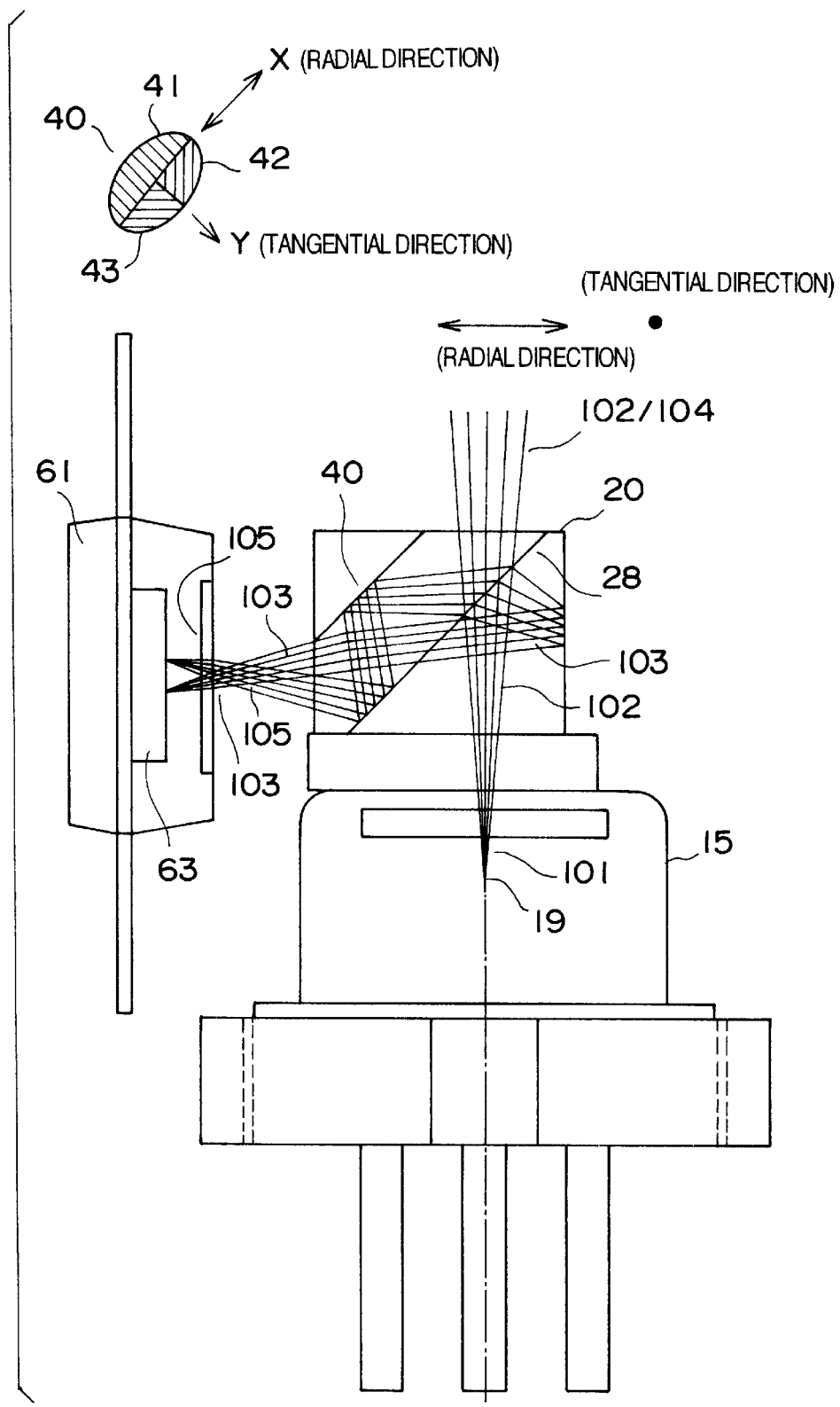

OPTICAL PICKUP APPARATUS

BACKGROUND OF THE INVENTION

1. Field of the Invention

The present invention relates to an optical pickup apparatus used for recording to and reproducing from an optical disk, a method of assembling the optical pickup apparatus, a method of detecting optical power, and an optical disk system employing the optical pickup apparatus.

2. Description of Related Art

In recent years, computers have accomplished marked progress in reducing their sizes and enhancing their performance. Optical disk devices are extensively used as storage devices for computers because of their large storage capacities and ease of handling. In keeping with the trend towards downsizing of computers, optical disk devices have achieved a significant reduction in their size.

To successfully reduce the size of an optical disk device, it is most important to make an optical pickup apparatus small-sized. For this reason, various proposals have been made that are considered to be useful for making small-sized optical pickup apparatuses.

For instance, according to the invention disclosed in U.S. Pat. No. 5,712,841 (Willem), a cylindrical unit provided with a diffraction grating and a mirror covers a light source, and a photodetector for detecting returning light from an optical disk is disposed on a side surface of the cylindrical unit. According to another invention disclosed in Japanese Patent Unexamined Publication No. 9-297935, a diffraction grating, a semi-reflecting surface and a transmitting surface are integrally formed with a multifunctional prism.

The "optical disk" referred to in the present invention is a generic term of recording media that allow signals to be reproduced therefrom or recorded thereto by using light beams; differences in recording system, including a recording density, the wavelength used for light beams, the combined use with magnetism, are ignored.

The above proposals, however, have not yet provided a satisfactory solution to a configuration or the like required for accurately and efficiently verifying the optical power during recording or a configuration or the like required for accurately disposing and assembling a light source, a photodetector, a multifunctional prism or a cylindrical unit, etc.

No satisfactory solution has been attained even after using light sources or photodetectors having configurations or performance exclusively designed for pickups. Furthermore, even if commercially available various-purpose light sources or photodetectors is used, this has not made it possible to provide a smaller, inexpensive optical pickup apparatuses.

SUMMARY OF THE INVENTION

The present invention has been made to solve the aforementioned problems, and it is an object of the invention to provide a small, inexpensive optical pickup apparatus that can be constructed by using a various-purpose luminescent element, and assembled with high accuracy, and is capable of accurately and efficiently detecting the optical power of the luminescent element.

According to the present invention, there is provided an optical pickup apparatus having a various-purpose luminescent element, an integrated optical means for guiding a luminous flux emitted from the luminescent element to an optical disk and for splitting a luminous flux reflected from the optical disk, a light-receiving means for receiving light and converting the received light into an electrical signal, and a coupling means for retaining the positional relationship among the luminescent element, the light-receiving means, and the integrated optical means.

The present invention makes it possible to provide a smaller, inexpensive optical pickup apparatus that can be constructed by using a various-purpose luminescent element, can be assembled with high accuracy, and is capable of accurately and efficiently detecting the optical power of the luminescent element.

BRIEF DESCRIPTION OF THE DRAWINGS

FIG. 11 is a view illustrating an operation of the composite component.

DESCRIPTION OF THE PREFERRED EMBODIMENTS

Figure 1:
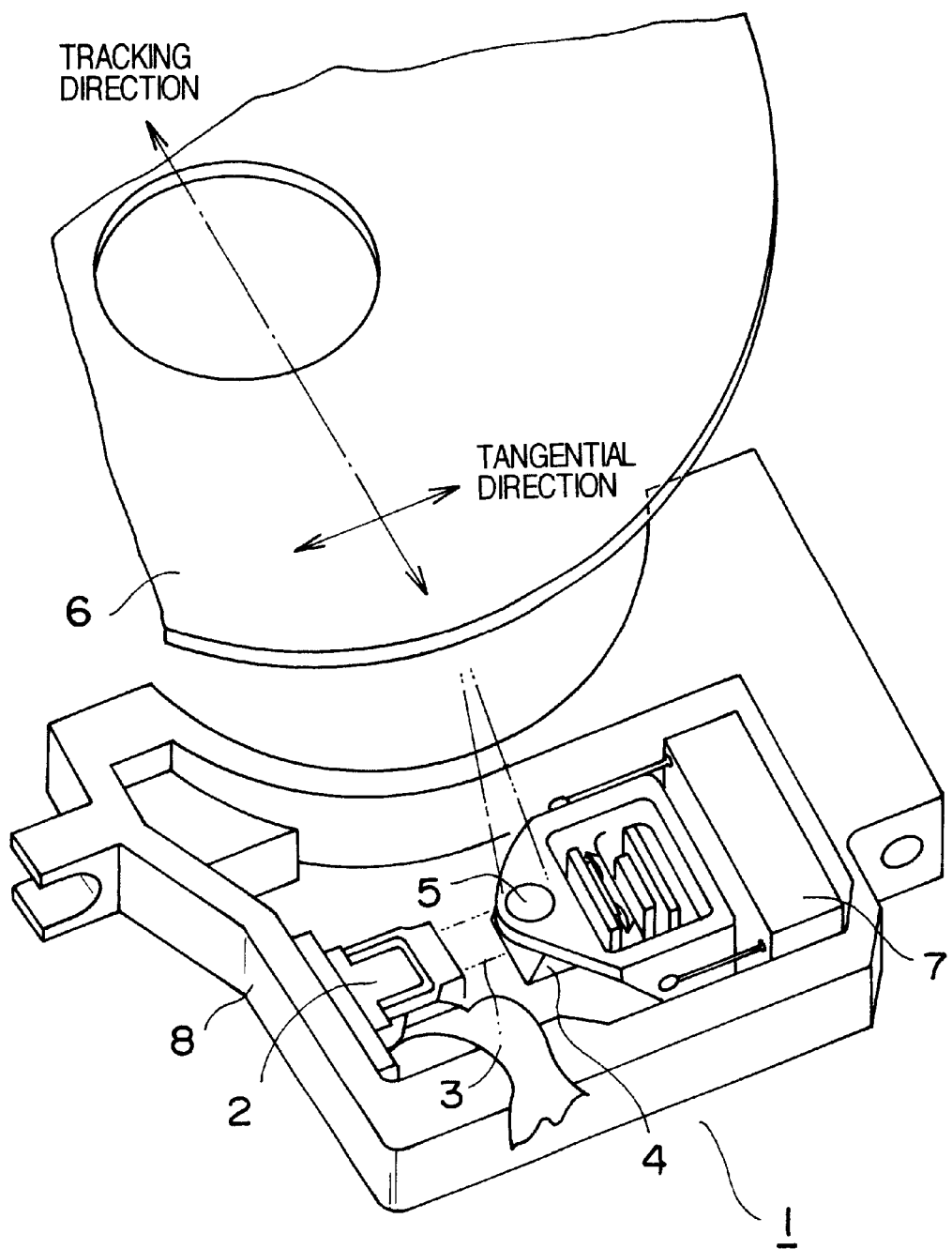
FIG. 1 is a perspective view generally showing an optical pickup.

An embodiment of the present invention will now be described with reference to the accompanying drawings. FIG. 1 is a perspective view showing the entire optical pickup. Referring to FIG. 1, the whole is referred to an optical pickup 1 and has main structural parts as follows. A composite component 2 emits a light beam 3. A mirror 4 deflects the light beam 3, and an object lens 5 converges the light beam 3. The light beam 3 is focused onto an information recording layer of an optical disk 6. The light reflected from the information recording layer traces the reversed path, and is detected by the composite component 2.

The information recording layer of the optical disk 6 has information tracks formed concentrically, or spirally to be more accurate. Those arrangement is made so that the light beam 3 emitted from the composite component 2 is directed in the tangential direction (the tangent of the tracks) of the optical disk 6. An actuator 7 supports the object lens 5 as made displaceable so as to allow the light beam 3 to be focused on the information recording layer of the optical disk 6 and to perform infinitesimal tracking in the direction of tracks. The composite component 2, the mirror 4, the object lens 5, and the actuator 7 mentioned above are mounted on a carriage 8. To move the components beyond a tracking range, the entire carriage 8 is moved in the radial direction of the optical disk 6.

Figure 2:
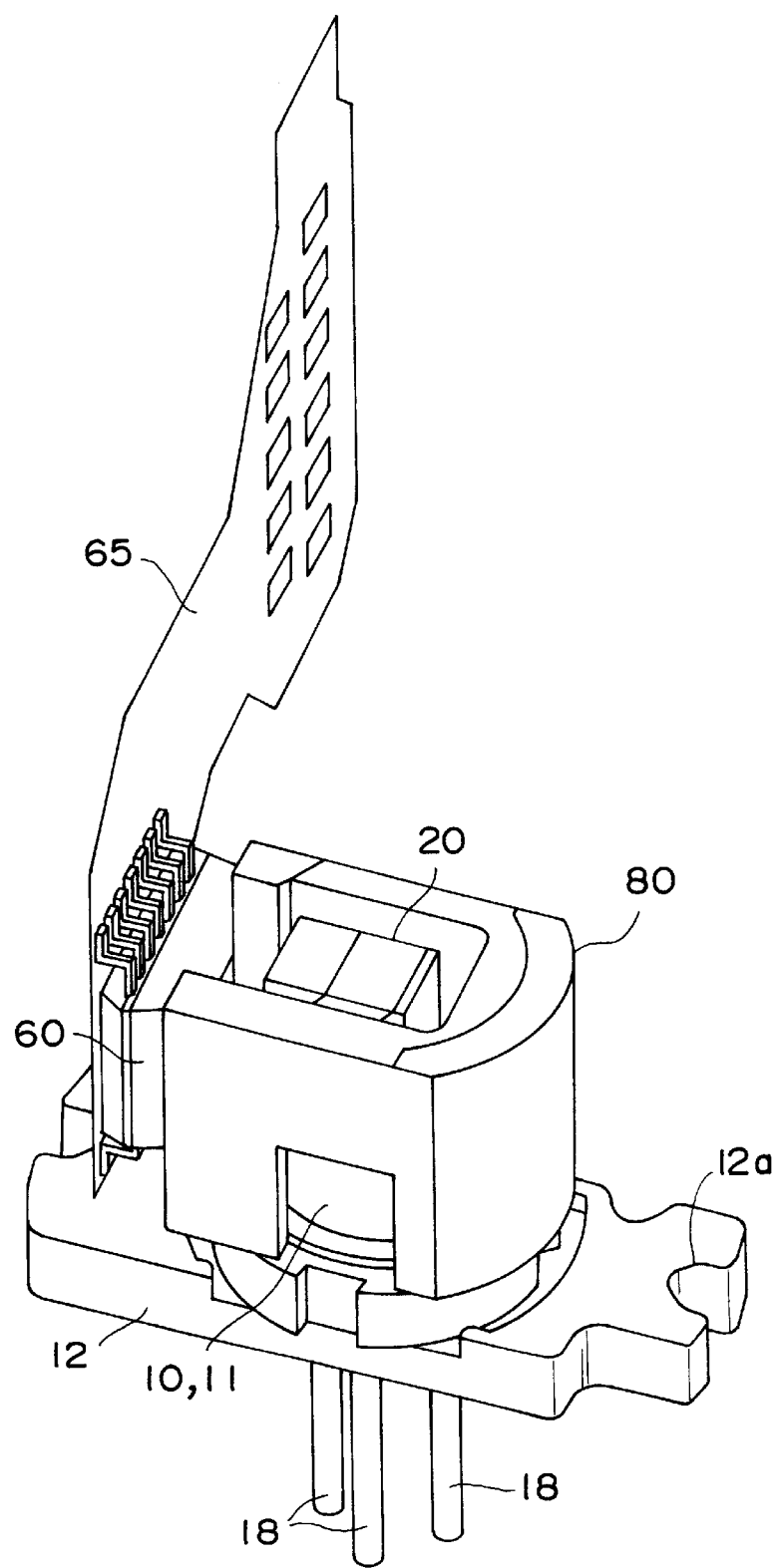
FIG. 2 is a perspective view of a whole composite component.
Figure 3:
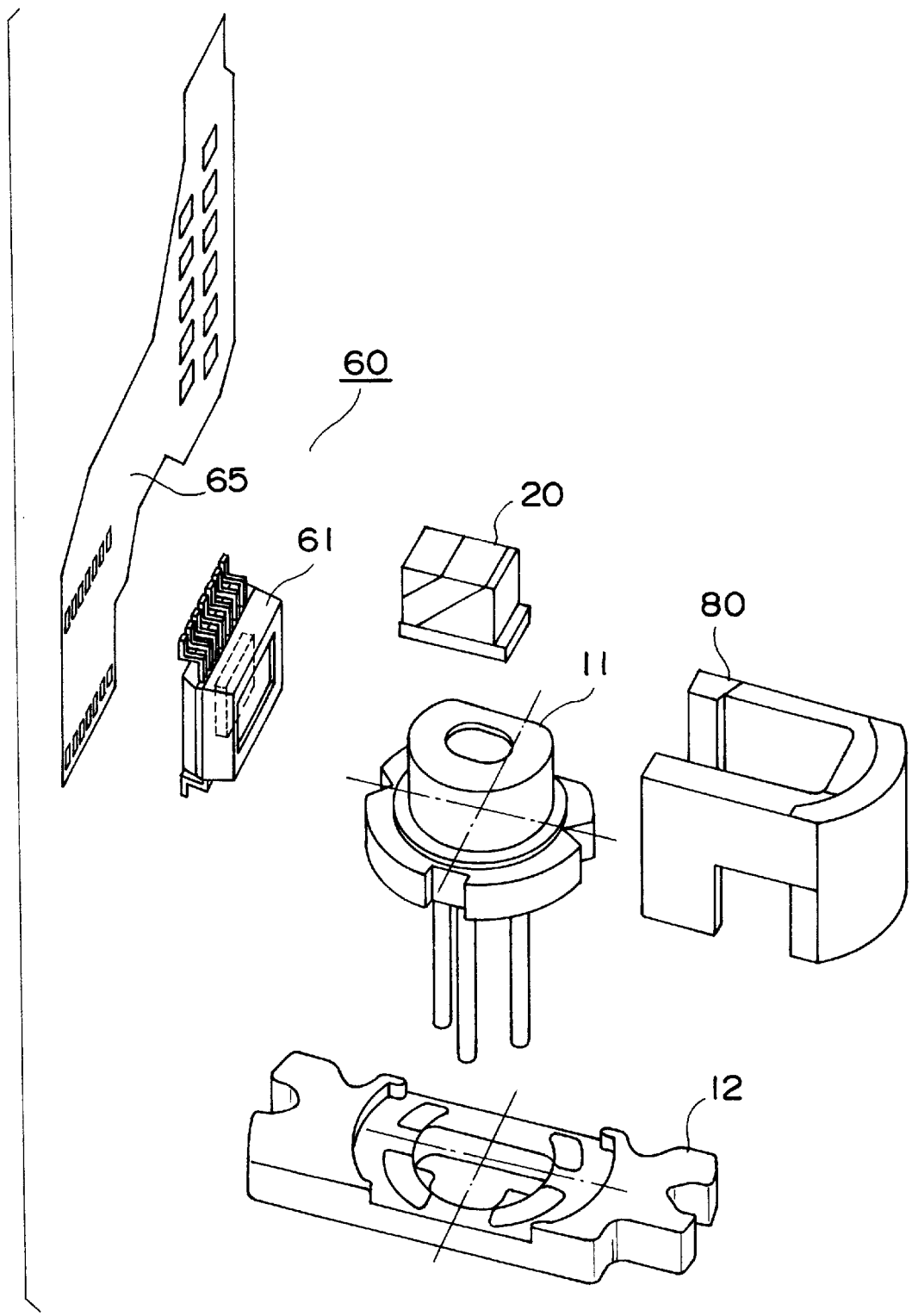
FIG. 3 is an exploded perspective view of the composite component shown in FIG. 2.

The composite component 2, which is the topic of the present invention, will be described. FIG. 2 is a perspective view showing the whole composite component, and FIG. 3 is an exploded perspective view of the composite component shown in FIG. 2. In FIGS. 2 and 3, the composite component 2 has a light source 10, an integrated optical assembly 20, a light receiver 60, and a coupling member 80. Each of these components will be described in order.

Figure 4:
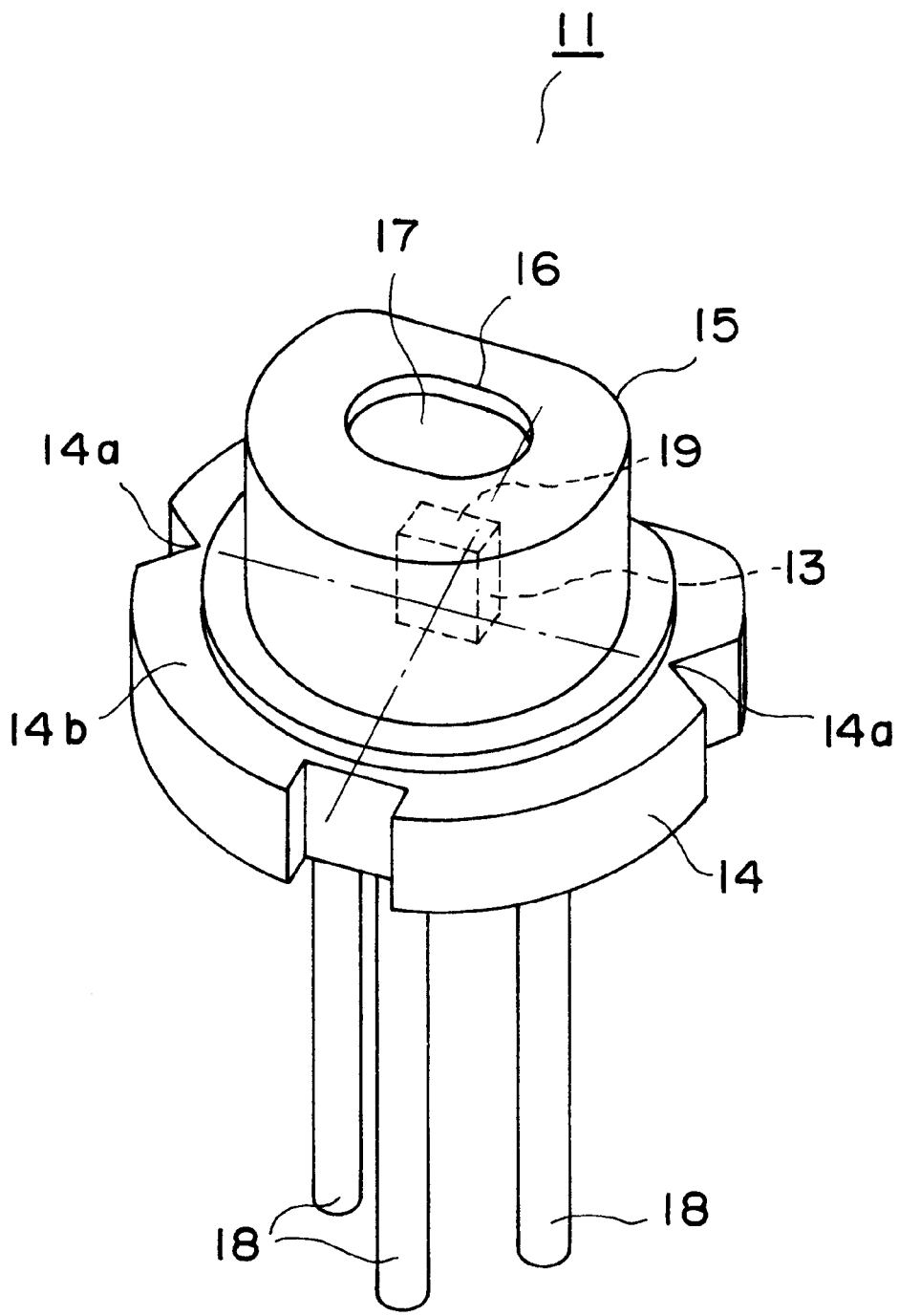
FIG. 4 is a perspective view showing an appearance of a various-purpose semiconductor laser.

First, the light source 10 is formed of a various-purpose semiconductor laser 11 fixed to a base member 12. FIG. 4 is a perspective view showing the appearance of the various-purpose semiconductor laser 11. Referring to FIG. 2 to FIG. 4, the various-purpose semiconductor laser 11 is formed by sealing a laser element 13 by a stem 14 and an envelope 15, and an exit port 16 for laser beams is sealed by a covering glass member 17. The laser element 13 is connected to leads 18, and penetrates the stem 14 while maintaining the hermetically sealed and insulated condition, then led to the outside. Thus, the various-purpose semiconductor laser 11 is one of the most typical various-purpose semiconductor lasers. Hence, the most expensive component among the required components can be obtained at low cost, enabling an inexpensive optical pickup apparatus to be provided.

In general, the position of a luminescent point 19 coincides with the center point of the outer circumference of the stem 14. The height of the luminescent point 19 in the direction of the optical axis is defined by the height from an upper surface 14b of the stem 14. The plane of polarization of an emitted beam is defined by an angle (normally parallel) with respect to a virtual line connecting a marker 14a formed on the stem 14.

The base member 12 is provided with a base marker 12a, which is formed as a V-shaped positioner. The light source 10 is assembled by aligning the virtual line connecting the base marker 12a with the virtual line connecting the marker 14a. This allows the plane of polarization of the emitted beam to be displayed also on the base member 12. The base member 12 is formed of a metal material, such as Al, Zn, Fe, or brass, that exhibits good thermal conductivity and machinability, and is easily available. The heat radiation of the laser element 13 from the stem 14 can be effectively enhanced through the base member 12 and the coupling member 80. Furthermore, the base member 12 may be used in place of the stem 14 to easily install the various-purpose semiconductor laser 11 to a mounting member (the carriage 8 in this embodiment of the invention). This arrangement makes it possible to configure the assembly to suit the shape of the mounting portion of the carriage 8 without being restrained by the shape of the stem 14.

Figure 5:
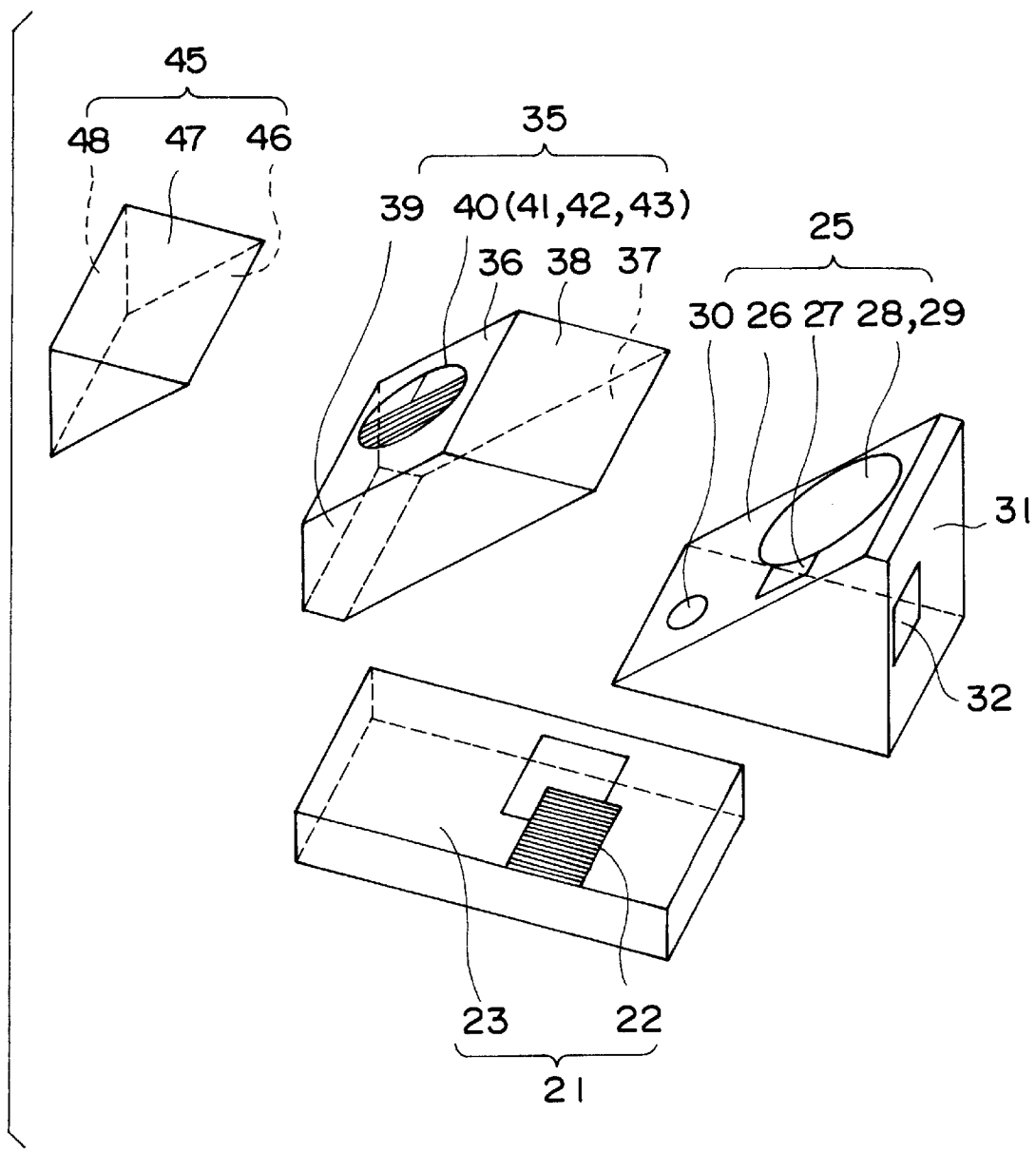
FIG. 5 is an exploded perspective view showing an integrated optical assembly.

The whole configuration of the integrated optical assembly 20 will now be described. FIG. 5 is an exploded perspective view of the integrated optical assembly 20. Referring to FIG. 2 through FIG. 5, the integrated optical assembly 20 is constructed by first to fourth light guiding members, which are made of a resin material having high transmittance or an optical glass material. In particular, an optical glass, such as SFL-1.6 or BK-7, exhibits high refractive index, and permits a large design allowance for a diffraction grating or a film, thus minimizing a chance of the occurrence of a wavelength shift at transmission. The optical glass BK-7-1.5 is particularly preferable because it is easily available and exhibits good machinability.

Each of the light guiding members will now be described. A first light guiding member 21 is formed of parallel plates, and a first diffraction grating 22 is formed in the surface of the first light guiding member 21, which surface opposes the exit port 16 in order to generate primary and auxiliary beams (hereinafter generally referred to as "the three beams") used for tracking control employing diffracted zero-order beam and ±1st-order beam.

The first diffraction grating 22 is formed on the optical glass material BK-7 mainly by grinding or etching. The technology related to the forming method has been disclosed in detail in the Japanese Patent No. 2806293, and the present invention employs the etching process, the description of which will be omitted by simply quoting the publication. In this case, the pitch and the depth of the grating of the first diffraction grating 22 are set to optimum values according to the wavelength of a light beam and the optical power of each of the three beams.

The exit surface of the first light guiding member 21 is provided with a light absorbing film 23 all over the surface thereof except for an area, through which light beams are transmitted, to block unwanted light caused by irregular reflection or the like and to prevent stray light from entering the integrated optical assembly 20 and the optical path of light beams. The light absorbing film 23 is composed of, for example, a multilayer film formed by, for example, Si, Ti, and $SiO_2$. Several types of film configurations will be described hereinafter, all of which are thin films formed mainly by vacuum vapor deposition. These films will be generically referred to as "optical thin films."

A second light guiding member 25 is formed into a substantially triangle pole shape having a substantially right triangle section. A second diffraction grating 27 (outgoing light extracting means) is formed in a predetermined area of a slope 26 of the substantially right triangle. The second diffraction grating 27 is formed in the same manner as that for the first diffraction grating 22. The light beam incident upon the second light guiding member 25 from the first light guiding member 21 is diffused light. Hence, the second diffraction grating 27 reflects the diffused light and converts the diffused light beam into a convergent beam so as to focus it onto an optical power detecting means 66 (refer to FIG. 7 to be discussed hereinafter). The same setting conditions as that for the first diffraction grating 22 described above apply to the grating pitch and the grating depth of the second diffraction grating 27. The second diffraction grating 27 is set so that +1st-order beam becomes the primary component of reflective diffraction light to thereby converge more light onto the optical power detecting means 66 for ensuring the accuracy in detecting the optical power by enhancing the optical power to be detected.

The second diffraction grating 27 is coated with a reflection film to enable it to accurately function as a reflective diffraction grating. A composition of the reflection film is formed of dielectric multilayer film or metal film. Specifically, a composition of the reflection is formed of a metal material, such as Ag, Al, Cu, or Au having high reflectivity and by using vacuum vapor deposition so as to fully utilize the high reflectivity of the material itself and the high efficiency of the diffraction grating.

The slope 26 is coated with a splitting film 28 all over its surface including the second diffraction grating 27. The splitting film 28 allows substantially 100% of an outgoing light beam on an incident path from the first light guiding member 21 to pass therethrough, while it reflects substantially 100% of the light beam on a reflecting path that is reflected from the optical disk 6 and comes back to the second light guiding member 25. The function of the splitting film 28 is closely connected to the luminescent characteristics of the general-purpose semiconductor laser 11 and the presence of a polarizing member (¼-λ plate) in an optical path. Specifically, the splitting film 28 is composed of a beam splitter or constructed so as to act on both P-polarized light and S-polarized light. Furthermore, the splitting film 28 is configured so as to transmit P-polarized light and reflect S-polarized light when the general-purpose semiconductor laser 11 emits P-polarized light. Conversely, if the general-purpose semiconductor laser 11 emits S-polarized light, then the splitting film 28 is configured to transmit S-polarized light and reflects P-polarized light.

The splitting film 28 is composed of a dielectric laminated film of, for example, $TiO_2$ and $SiO_2$, or a dielectric laminated film of, for example, $Ta_2O_5$ and $SiO_2$. The whole surface of the slope 26 is coated with the splitting film 28 to reduce the number of patterning steps for forming the film and also to protect the aforesaid reflection film coating from the corrosion caused by an atmosphere. Moreover, as it will be discussed hereinafter, the presence of the splitting film 28 adjacent to the second diffraction grating 27 makes it possible to guide the outgoing light, which does not contributed to reproduction and recording, in the outgoing light beam, which is diffused light, to the optical power detecting means 66. With this arrangement, the optical power that is precisely proportional to the optical power of the light source can be detected.

A side surface 31, which is the other surface of the second light guiding member 25, is provided with a side surface reflection film 32 formed in a predetermined area thereof to reflect again the diffracted light that has been reflected by the second diffraction grating 27 and to converge the diffracted light onto the optical power detecting means 66. The composition of the side surface reflection film 32 is the same as that of the reflection film coating of the second diffraction grating 27. In the process for forming the integrated optical assembly 20, which will be discussed later, the whole side surface 31 including the side surface reflection film 32 is coated with a light absorbing film in order to absorb unwanted internal reflection, to prevent the entry of stray light, and to protect the reflection film coating from the corrosion caused by an atmosphere. The composition of the light absorbing film is the same as that of the light absorbing film 23 described above.

A third light guiding member 35 is formed into a substantially trapezoidal prism having a substantially trapezoidal section. The respective surfaces include a first slope 36, a second slope 37, a transmitting surface 38, and an exit surface 39. The first slope 36 and the second slope 37 are opposing planes that are parallel to each other, and a third diffraction grating 40 is formed in a predetermined area of the first slope 36. The same forming process and the same setting conditions for the first diffraction grating 22 described above apply to the forming process and the grating pitch and the grating depth of the third diffraction grating 40.

To efficiently detect returning light beams, the third diffraction grating 40, in particular, is set so that the reflective diffraction light includes a +1st-order beam as its primary component. The 0th-order beam derived by the third diffraction grating 40 is guided to an area where no light receiving means is present. The –1st-order beam is guided to an area where no light receiving means is present and to the light absorbing film 23 of the aforesaid first light guiding member 21. Thus, the remaining returning light other than the +1st-order beam, which is the primary component, is either absorbed or guided to the area where no light receiving means is present, so that it does not turn into stray light.

The third diffraction grating 40 is coated with a reflection film as in the case of the second diffraction grating 27 mentioned above, and the reflection film has the same composition as that of the second diffraction grating 27.

Furthermore, the whole surface of the first slope 36 including the reflection film coating is coated with a protective film or a light absorbing film to absorb unwanted internal reflection, to prevent the entry of stray light, and to protect the reflection film coating from the corrosion caused by an atmosphere. The composition of the light absorbing film is the same as that of the light absorbing film 23 described above.

When the third light guiding member 35 is joined to the second light guiding member 25, the light reflected by the splitting film 28 and the whole slope 26 enters the third diffraction grating 40. The returning light turns into a +1st-order reflected diffraction beam and travels to the second light guiding member 25. This light is reflected again by the splitting film 28 and the whole slope 26, then exits from the exit surface 39, and travels to the optical power detecting means 66. At this time, an auxiliary reflection film 30 is preferably formed on the slope 26 of the second light guiding member 25 that corresponds to the area where the reflective diffraction light is reflected at the splitting film 28 (i.e., between the corresponding area of the slope 26 and the splitting film 28). The auxiliary reflection film 30 will improve the reflecting capability of the splitting film 28 when reflecting the reflective diffraction light because the reflective diffraction light has an angle based on diffraction in relation to an expected incident angle on the splitting film 28. The provision of the auxiliary reflection film 30, therefore, makes it possible to restrain the level variations in the signal detection by the optical power detecting means 66.

The aforesaid light absorbing film is provided on the whole area of the second slope 37 except for the area of the second slope 37 through which the light beam directing to the second light guiding member 25 from inside the third light guiding member 35, the returning light that has been reflected by the splitting film 28 back into the third light guiding member 35, and the light beam (a part of the outgoing light) directed to the optical power detecting means 66 via the third light guiding member 35 from inside the second light guiding member 25 (hereinafter referred to as "the incident area of the second slope"). The coating of the light absorbing film helps the integrated optical assembly 20 to display its functions, allowing the SN ratio of the optical power detecting means 66 to be improved, and also absorbs and removes the stray light coming from the second light guiding member 25 and entering the exit surface 39 of the third light guiding member 35.

A fourth light guiding member 45 is formed into a substantially triangle pole shape having a substantially right triangle section. The fourth light guiding member 45 has a slope 46, a first facet 47, and a second facet 48. The first facet 47 and the second facet 48 intersect with each other at right angles, and provide the reference surface of the integrated optical assembly 20. The whole surface of the slope 46 is covered with a light absorbing film to absorb unwanted internal reflection and prevent entry of stray light when the fourth light guiding member 45 is joined to the foregoing third light absorbing member 35. This light absorbing film has the same composition as that of the foregoing light absorbing film 23.

The light absorbing film of the slope 46 is dispensable for the fourth light guiding member 45, and may be replaced with the coating by the protective film or the light absorbing film that has been described in conjunction with the third light guiding member 35. In this case, the fourth light guiding member 45 would be a member formed in a substantially triangle pole provided with no film.

Figure 6:
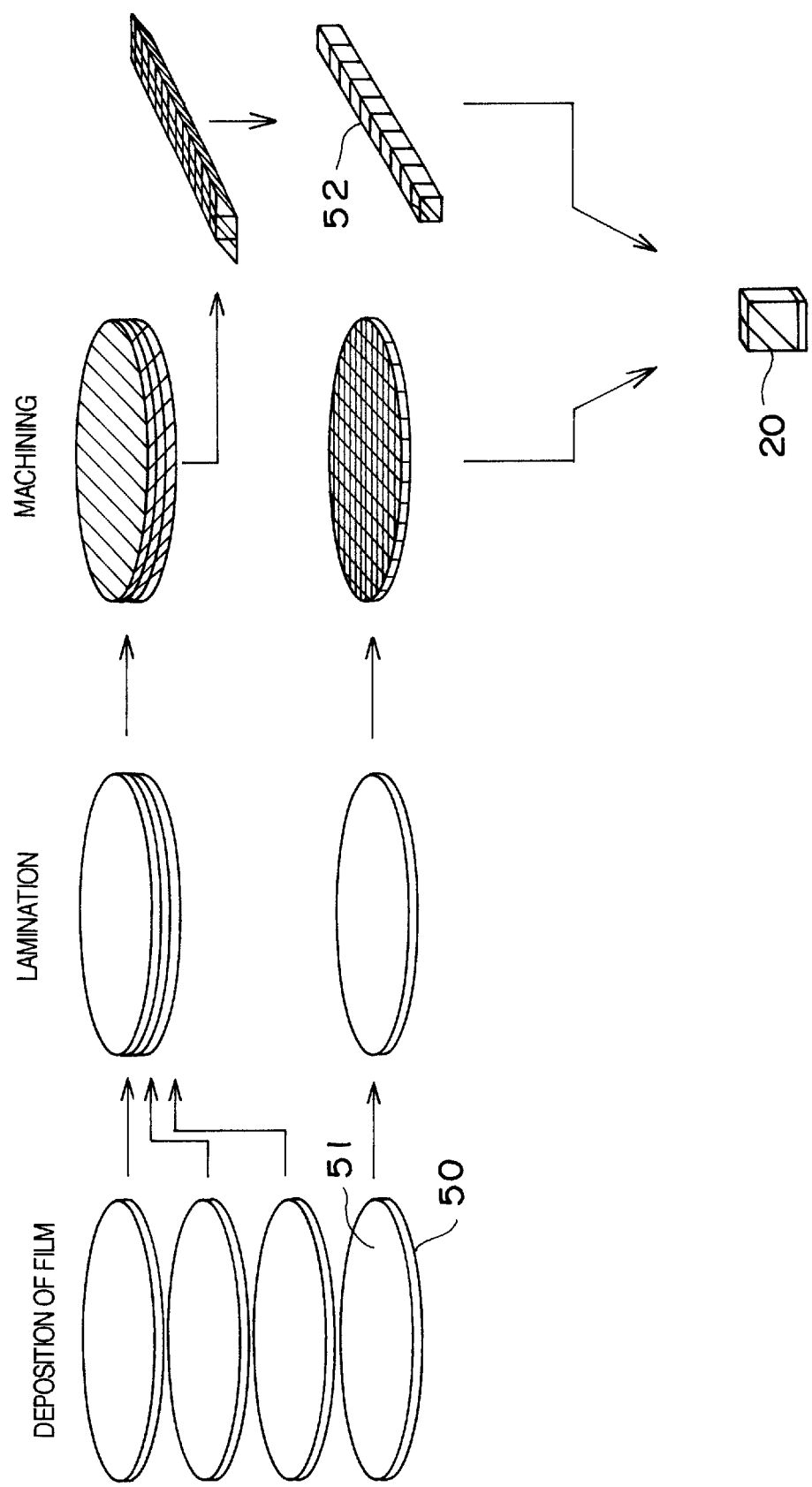
FIG. 6 is a diagram illustrating an assembly process of a light guiding member.

The procedure for assembling the light guiding members mentioned above will now be described. FIG. 6 is a diagram illustrating an assembly process of a light guiding member, which is primarily composed of three steps, namely, deposition of a film, lamination, and machining, i.e. cutting. The technological details of each of these steps have been disclosed in the Japanese Patent No. 2806293 and U.S. Pat. Nos. 5,790,502 and 5,978,344, so that the description of the steps will be omitted by quoting the publication of the patent, and only the steps peculiar to the present invention will be described. First, the step of deposition will be discussed. The composition of each film has already been set forth in conjunction with each light guiding member. The following will describe how to efficiently deposit all these different types of films. Referring to FIG. 6, reference numeral 50 designates glass substrates, the glass substrates 50 corresponding to the first light guiding member 21 through the fourth light guiding member 45. A deposition surface 51 corresponds to the slope of each light guiding member, and the thickness of each of the glass substrates 50 corresponds to the thickness of the first light guiding member 21 or the thickness measured perpendicularly to a slope. Basically, the film of each light guiding member is formed on one slope. The diffraction grating and the light absorbing film 23, the splitting film 28, etc. are formed on the deposition surface 51 (one surface) of the glass substrate 50. At the same time, markers (not shown) are also formed for the mutual positioning of the glass substrates 50 in the subsequent lamination step.

Then, all the glass substrates 50 except for the glass substrate 50 that provides the first light guiding member are laminated or joined. The markers are used for the positioning in the lamination step. Preferably, an adhesive agent having a refractive index that is as similar as possible to that of the glass substrates 50 is used, because the laminated surfaces provide paths through which light is transmitted. In the present invention, a thermosetting adhesive resin is employed to maintain a processing strength or bonding strength that survives the subsequent processing.

The machining (cutting) step will now be described. The glass substrate 50 that is now composed of the three laminated layers is cut at an angle with respect to the deposition surface 51 into bars having rhomboid sections. Then, a triangular corner portion that will provide the second light guiding member and another triangular corner portion that will provide the fourth light guiding member are cut. Thus, an integrated bar 52 having a substantially square section is cut out.

It is not until the cutting step is finished that the side surface 31, the transmitting surface 38, and the exit surface 39 are exposed on the integrated bar 52. After the reflection film is deposited at a predetermined position on the side surface 31, the light absorbing film 23 is deposited on the whole surface of the side surface 31. Furthermore, anti-reflection films are deposited on the transmitting surface 38 and the exit surface 39. Both the light absorbing film 23 and the anti-reflection film are the same ones as those described above in relation to the configurations of the films. The light absorbing film 23 of the side surface 31 is able to absorb and remove the stray light entering the integrated optical assembly 20. The anti-reflection film of the transmitting surface 38 and the exit surface 39 prevents unwanted irregular reflection of outgoing light or light beams heading toward the optical power detecting means 66 when the outgoing light or the light beams exit from the integrated optical assembly 20.

Subsequently, the integrated bar 52 is positioned on and bonded to the glass substrate 50 which will provide the first light guiding member 21. Then, the glass substrate 50 to which the integrated bar 52 has been bonded is cut perpendicularly to the glass substrate 50. Each piece resulting from the cutting provides the integrated optical assembly 20.

It is generally preferable to provide the cut surfaces with protective coating or glass passivation thereby to protect the joint surfaces exposed on the cut surfaces. The major reason for the need of the protection, however, is to protect the joint surfaces from the erosion by the moisture contained in outside air entering the joint surfaces due to expansion or shrinkage of components caused by changes in temperature.

The cut surfaces in the present invention, however, are not provided with any protective films. Instead, optical thin films are deposited on the external surfaces where the slope joint surfaces are exposed, among the surfaces constituting the external configuration. The optical thin films are not deposited on the external surfaces where the joint surfaces are exposed perpendicularly to the surfaces constituting the external configuration. This is because, according to the integrated optical assembly 20, no factor causing the generation of heat from loss of light in the optical path, so that the integrated optical assembly 20 will not generate heat. Furthermore, the envelope 15 is surrounded by the coupling member 80 and placed in a good heat radiating condition, meaning less influences of the heat generated by the laser element 13. In addition, as it will be discussed hereinafter, a space of an ambient atmosphere exists around the integrated optical assembly 20 (i.e., the space between the integrated optical assembly 20 and the coupling member 80), meaning that the integrated optical assembly 20 is not subjected to heat from the coupling member 80. Moreover, as compared with a case where a joint surface is exposed at an angle with respect to an external surface, the area of an exposed joint surface (laminated layer) is smaller in the case where the joint surface is exposed perpendicularly to the external surface. This makes it more difficult for moisture to enter the joint surface. This feature coupled with the use of the thermosetting adhesive resin that exhibits a sufficiently high bonding strength that survives the subsequent cutting obviates the need for providing the cut surfaces with any protective films, contributing greatly to a reduced number of processing steps and reduced cost.

Figure 7:
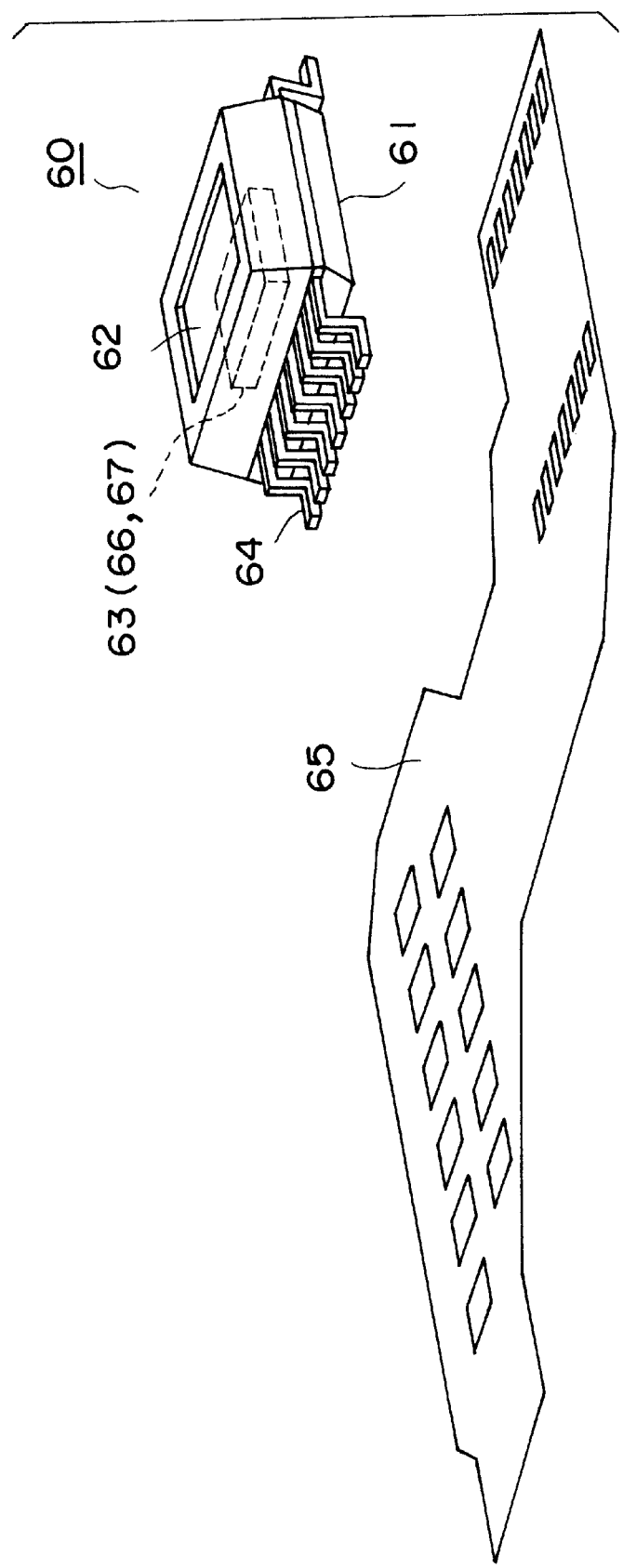
FIG. 7 is a perspective view of a whole optical receiver.

FIG. 7 is a general perspective view of the light receiver 60. An OE element 63 is housed in a package 61 having an incident port 62. A signal terminal of the OE element 63 is connected to a lead terminal 64 and led outside the package 61. Furthermore, a flexible cable 65 is connected to the lead terminal 64 for carrying out inspection or packaging.

Figure 8:
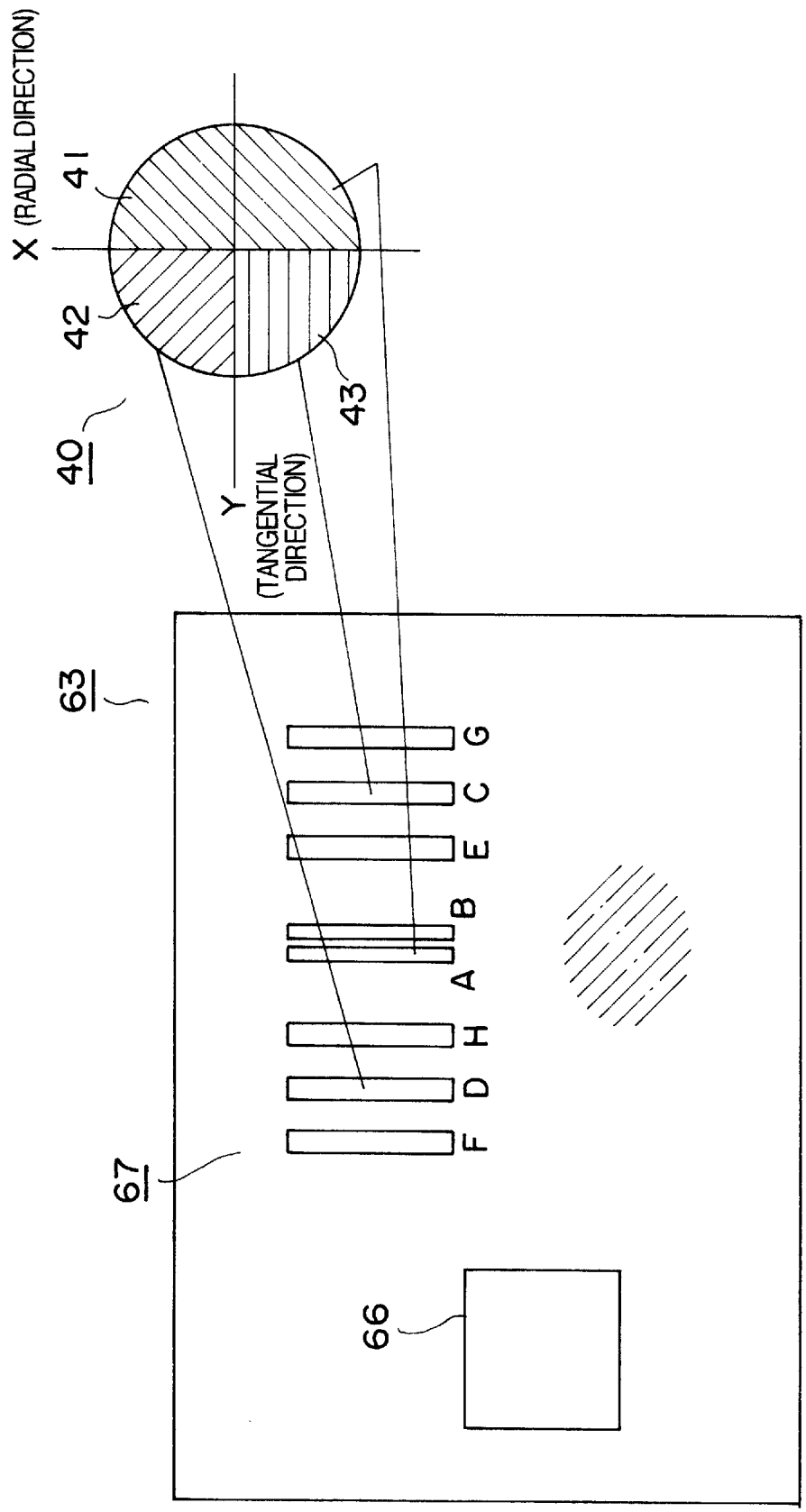
FIG. 8 is a pattern diagram of an OE element observed from an incident port.

FIG. 8 is a pattern diagram of the OE element 63 observed from the end of the incident port 62. Referring to FIG. 8, reference numeral 66 designates an OE element pattern equivalent to the optical power detecting means, and reference numeral 67 designates another OE element pattern equivalent to the light receiving means. There are eight OE element patterns in total. The outgoing light which has been reflected by the side surface reflection film 32 provided on the second light guiding member 25, and which is in the area that does not contribute to reproduction and recording is converged on the optical power detecting means 66. The +1st-order reflective diffraction light that has been reflected by the third diffraction grating 40 in the reflecting path (returning light) is converged on the light receiving means 67. The OE elements 63 produce electric current based on the quantity of light that has been received, and the electric current is taken out in the form of an electrical signal through an amplifier (not shown) connected in a subsequent stage.

Referring to FIG. 8, the relationship between the third diffraction grating 40 and the eight OE element patterns of the light receiving means 67 will be described. First, the third diffraction grating 40 is divided into two segments by an X-axis that is parallel to the radial direction of the optical disk 6, one of the segments being a grating A41. The reflective diffraction light of the grating A41 is focused at a light receiving means 67A and a light receiving means 67B provided at the center of a light receiving means 67, providing the primary beam for focus detection. The signals obtained from these two areas are processed by well-known methods, such as the knife edge method, the astigmatism method, or the spot size method. The blank areas provided at right and left of the light receiving means 67A and the light receiving means 67B in the drawing provide the areas where the auxiliary beams generated at the first diffraction grating 22 are focused through the grating A41. More specifically, the three beams generated at the first diffraction grating 22 are reflected by a disk surface, turned into three reflecting path beams, and separated by the splitting film 28. Furthermore, the primary beam of the three returning beams that have been diffracted by the grating A41 are focused on the light receiving means 67A and the light receiving means 67B.

The other divided segment is subdivided into two segments by a Y-axis that is parallel to the tangential direction (the direction of the tangent of a track) of the optical disk 6 (four divided segments), the segments being a grating B42 and a grating C43. Thus, the third diffraction grating 40 is divided into three segment areas, i.e. the grating A41 is ½ area of the third diffraction grating 40, the grating B42 and the grating C43 are ¼ areas of the third diffraction grating 40. The three returning beams that have been diffracted by the grating B42 are focused in the similar manner on a light receiving means 67D, a light receiving means 67F, and a light receiving means 67H provided on one end of the light receiving means 67. Further similarly, the three returning beams diffracted at the grating C43 are focused on a light receiving means 67C, a light receiving means 67E, and a light receiving means 67G provided on the other side of the light receiving means 67. These six light receiving areas are detected as the three beams for tracking control. For carrying out the tracking control, the three-spot method, the push-pull method, and the differential push-pull method that are widely known are used according to the combination of the light receiving areas.

Figure 9:
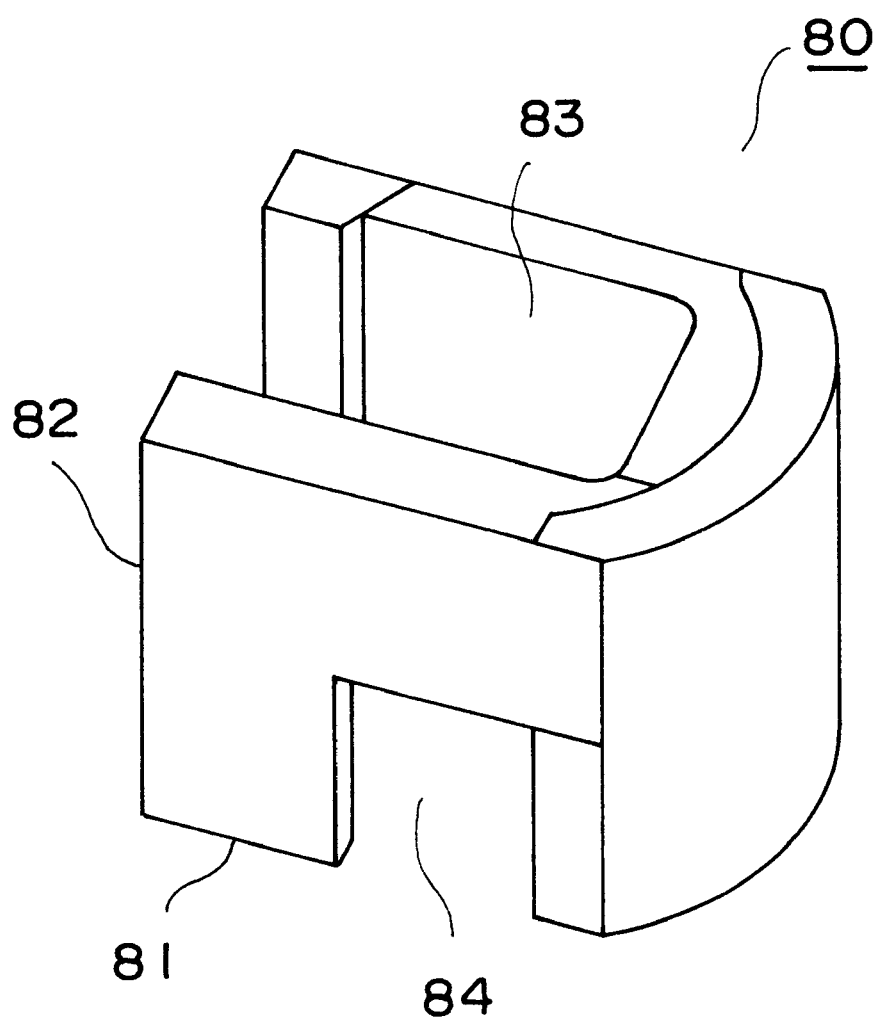
FIG. 9 is a perspective view of a coupling member.

FIG. 9 is a perspective view of the coupling member 80. Referring to FIG. 9, the coupling member 80 has a substantially semi-cylindrical shape. The substantially semi-cylindrical bottom surface of the coupling member 80 constitutes a stem coupling surface 81. The stem coupling surface 81 is rested on the upper surface 14b of the stem 14 and fixed using an adhesive agent or the like.

The substantially semi-cylindrical side surface of the coupling member 80 constitutes a light receiver coupling surface 82, and the light receiver 60 is secured to the light receiver coupling surface 82 by an adhesive agent or the like. Thus, the height of the outgoing light in the direction of the optical axis can be adjusted by adjusting the position where the light receiver 60 is installed to the light receiver coupling surface 82. The focal position and the incident angle of a beam incident upon the light receiver 60 can be adjusted by the position where the stem coupling surface 81 is installed to the upper surface 14b and the rotational angle.

The semi-cylindrical top of the coupling member 80 is formed as a free opening. This opening provides an exit window 83 through which outgoing light exit and returning light enters. The height of the coupling member 80 in the direction of the outgoing light is set to be slightly higher than the height of the integrated optical assembly 20 that has been mounted on the general-purpose semiconductor laser 11.

The integrated optical assembly 20 is machined such that the projection area thereof in the direction of outgoing light is smaller than the projection area of the envelope 15 in the direction of outgoing light. More specifically, the integrated optical assembly 20 is cut such that the projection area thereof in the direction of the outgoing light has a rectangular shape substantially inscribed to the envelope 15. With this arrangement, the coupling member 80 is able to protect the integrated optical assembly 20 from physical external forces by fitting the coupling member 80 to the envelope 15 and then mounting these components on the upper surface 14b.

Moreover, the external dimension of the integrated optical assembly 20 (the aforesaid inscribed rectangular shape) is smaller than the envelope 15, and the inside diameter of the coupling member 80 allows positional adjustment with respect to the configuration of the external shape of the envelope 15. It is possible, therefore, to make adjustment for absorbing accumulated errors, including the positional error of the luminescent point 19 of the laser element 13, the dimensional error of the stem 14, the machining error of the integrated optical assembly 20, and the dimensional error of the light receiver 60 when assembling the apparatus. This means that the apparatus can be assembled with satisfactory accuracy even when an extremely common general-purpose semiconductor laser 11 is used.

The other side surface of the coupling member 80 is provided with an adjustment access windows 84 that is partially opened in the other side surface. The adjustment access window 84 is used for positioning when adjusting the positioning of the coupling member 80 and for pouring an adhesive agent, and also functions as a window through which ultraviolet rays are applied to cure the adhesive agent. In addition, the coupling member 80 surrounds the integrated optical assembly 20, making it possible to prevent disturbance light or stray light from directly entering the integrated optical assembly 20.

The coupling member 80 is composed of a metal material, such as Al, Zn, Fe, or brass, that exhibits good thermal conductivity and machinability, and is easily available. As mentioned above, the heat radiation of the laser element 13 from the envelope 15 can be effectively enhanced through the coupling member 80. It is possible to make small components having complicated configurations with high accuracy at low cost. Thus, the composite component 2 can be made in a sufficiently small size at low cost even when the extremely common general-purpose semiconductor laser 11 is used.

Figure 10:
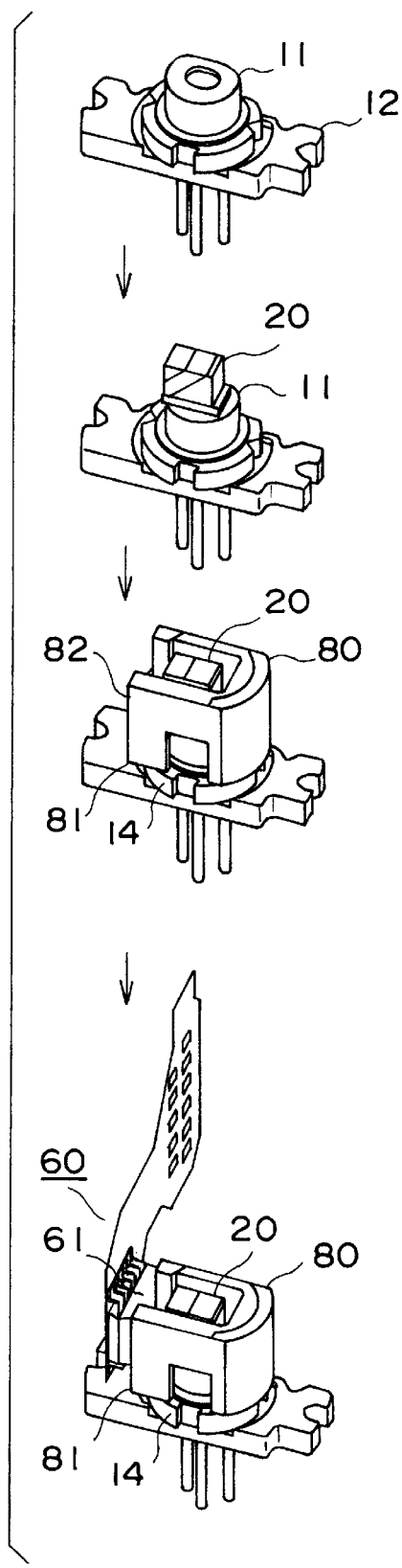
FIG. 10 is a diagram illustrating an assembly process of the composite component.

The procedure for assembling the components, which have been set forth above, into the composite component 2 will now be described. FIG. 10 is a diagram illustrating the assembly process of the composite component 2. Referring to FIG. 10, first, the integrated optical assembly 20 is bonded to the general-purpose semiconductor laser 11 to which the base member 12 has been bonded. At this time, tentative connection to the lead 18 is made for the laser element 13 to emit light thereby to perform positioning so that the optical axis of the emergent beam of the general-purpose semiconductor laser 11 aligns with the optical axis of outgoing light that enters and passes through the integrated optical assembly 20. At the same time, angle adjustment is made between the general-purpose semiconductor laser 11 and the integrated optical assembly 20 so that the diffractive direction of the first diffraction grating 22 agrees with the predetermined angle formed between the three beams on the optical disk 6 and the tracks adjacent thereto.

After completion of the positional and angular adjustments, the components are bonded at several peripheral points where the first light guiding member 21 and the envelope 15 are in contact with each other. According to the structure described above, satisfactory functions will be obtained once the first light guiding member 21 and the envelope 15 are fixed. Moreover, bonding these components secures an air layer between the covering glass member 17 and the first light guiding member 21, so that the diffractive function of the first diffraction grating 22 can be fully displayed by securing a large difference in refractive index between the air and the optical glass.

Next, tentative connection to the flexible cable 65 is made for operation in order to determine the positions and angles of the integrated optical assembly 20 and the light receiver 60. To maintain the position of the light receiver 60, the stem coupling surface 81 of the coupling member 80 is bonded to the stem 14 and the light receiver coupling surface 82 is bonded to the incident port 62 of the package 61. As previously mentioned, the position of the coupling member 80 can be adjusted, so that accumulated errors, including the positional error of the luminescent point 19 of the laser element 13, the dimensional error of the stem 14, the machining error of the integrated optical assembly 20, and the dimensional error of the light receiver 60 can be absorbed.

The general operation of the composite component 2 constructed as set forth above will be described in conjunction with FIG. 11. FIG. 11 is a view illustrating the operation of the composite device 2. First, as shown in FIG. 11, a connection required is made to the lead 18, and the laser element 13 emits a diffusing light beam 101 from the luminescent point 19. The light beam 101 is transmitted through the covering glass member 17 and enters the first light guiding member 21.

The first light guiding member 21 absorbs, by the light absorbing film 23, unwanted disturbance light or a light beam that has diffused for a predetermined diffusion angle or more, and also coverts the diffusing light beam 101 into the three-beam outgoing light 102 by the first diffraction grating 22.

The outgoing light 102 enters the second light guiding member 25 from the first light guiding member 21, and the outgoing light 102 travels in the second light guiding member 25 and reaches the slope 26. The majority of the outgoing light 102 passes through the splitting film 28 and enters the third light guiding member 35. The outgoing light 102 further passes through the transmitting surface 38 of the third light guiding member 35, and changes its course when it reaches the mirror 4 so as to travel toward the optical disk 6. The outgoing light 102 is turned into a convergent light beam by the object lens before it is incident upon the optical disk 6.

Of the outgoing light 102, which is the diffused light having reached the slope 26, a part of the outgoing light 102 in an area around the beams that does not contribute to reproduction and recording is incident upon the second diffraction grating 27. In other words, a part of the peripheral area of the outgoing light 102 is extracted by the second diffraction grating 27, and turned into a monitor reflective diffraction light beams 103 of the convergent light. The monitoring reflective diffraction light beams 103 travels to the side surface reflection film 32 where it is reflected again, passes and penetrates through the second light guiding member 25 and the third light guiding member 35, and exits from the exit surface 39. The monitoring reflective diffraction light beams 103 is focused on the optical power detecting means 66 of the light receiver 60. Thus, since a part of the outgoing light 102 in the area that does not contribute to reproduction and recording is used for detecting optical power, the detection of the optical power that is precisely proportionate to the luminescent power of the laser element 13 can be performed, and an extremely good front monitoring method wherein reproduction and recording is not affected by the quantity of light can be provided.

The returning light 104 reflected by a recording layer of the optical disk 6 passes through the object lens 5 and the mirror 4 and enters the transmitting surface 38 of the third light guiding member 35 by following the reverse order. The returning light 104 is reflected by the splitting film 28 and directed to the third diffraction grating 40 of the third light guiding member 35. At the third diffraction grating 40, the returning light 104 turns into a returning reflective diffraction light lays 105 having +1st-order diffracted light as its primary component. The returning reflective diffraction light beams 105 are reflected again by an auxiliary reflection film 30 of the second light guiding member 25 and exit from the exit surface 39 toward the light receiver 60. Further, the returning reflective diffraction light beams 105 reflected from the grading areas of the respective grating A 41, the grating B 42, and the grating C 43 as shown in FIG. 11 are respectively converged on the light receiving means 67A through the light receiving means 67H. Thus, the focus control and the tracking control can be carried out by combining the detection signals of the light receiving means 67A through the light receiving means 67H.

As described in detail above, according to the present invention, a small, inexpensive optical pickup apparatus that can be constructed by using a general-purpose luminescent element can be assembled with high accuracy, the optical pickup apparatus being capable of accurately and efficiently detecting the optical power of the luminescent element.

What is claimed is:

1. An optical pickup apparatus comprising:
   a luminescent element for sealing a laser element by a stem and an envelope and further having an exit port of luminous flux provided on said envelope;
   integrated optical means for guiding said luminous flux of said luminescent element to an optical disk and for separating reflected light from the optical disk and further bonded directly to said envelope by adhesion so as to seal the exit port of the envelope;
   light receiving means for receiving light and converting it into an electrical signal; and
   coupling means for retaining a positional relationship among said luminescent element, said integrated optical means, and the light receiving means.

2. An optical pickup apparatus according to claim 1, wherein said integrated optical means has a diffraction grating, and the diffraction grating is outgoing light extracting means for extracting a light beam from the emitted luminous flux guided to the optical disk.

3. An optical pickup apparatus according to claim 1, wherein said integrated optical means has a plurality of optical surfaces and a diffraction grating therein, and the diffraction grating is formed on one of the optical surfaces.

4. An optical pickup apparatus according to claim 1, wherein said integrated optical means has, therein, a plurality of optical surfaces inclined with respect to an emergent light optical axis of said luminescent element, a plurality of optical surfaces perpendicular to the emergent light optical axis of said luminescent element, and outgoing light extracting means for extracting a light beam from the emitted luminous flux guided to the optical disk, and said outgoing light extracting means is a diffraction grating formed on one of said optical surfaces inclined with respect to the emergent light optical axis.

5. An optical pickup apparatus according to claim 1, wherein said integrated optical means has an optical thin film disposed on an external surface where an inclined joint surface appears, among the surfaces constituting the external configuration thereof.

6. An optical pickup apparatus comprising:

a various-purpose luminescent element;

integrated optical means for guiding an emitted luminous flux of said luminescent element to an optical disk and for separating reflected light from the optical disk;

light receiving means for receiving light and converting it into an electrical signal; and coupling means for retaining a positional relationship among said luminescent element, said integrated optical means, and said light receiving means, wherein said integrated optical means has outgoing light extracting means for extracting a light beam in an area that does not contribute to reproduction and recording among the emitted luminous flux guided to the optical disk, and the light receiving means receives the reflected light from the optical disk and the light extracted by the outgoing light extracting means.

7. An optical pickup apparatus comprising:

a various-purpose luminescent element;

integrated optical means for guiding an emitted luminous flux of said luminescent element to an optical disk and for separating reflected light from said optical disk;

light receiving means for receiving light and converting it into an electrical signal; and coupling means for retaining a positional relationship among said luminescent element, said integrated optical means, and said light receiving means, wherein a projection area of said integrated optical means in the direction of the emitted luminous flux is smaller than the projection area of said luminescent element in the direction of the emitted luminous flux, an inside diameter of said coupling means is larger than an external configuration of said luminescent element, and a position of said coupling means can be adjusted with respect to said luminescent element.

8. An optical pickup apparatus according to claim 6, wherein said integrated optical means has a diffraction grating, and said diffraction grating is outgoing light extracting means for extracting a light beam from the emitted luminous flux guided to the optical disk.

9. An optical pickup apparatus according to claim 6, wherein said integrated optical means has a plurality of optical surfaces and a diffraction grating therein, and said diffraction grating is formed on one of said optical surfaces.

10. An optical pickup apparatus according to claim 6, wherein said integrated optical means has, therein, a plurality of optical surfaces inclined with respect to an emergent light optical axis of said luminescent element, a plurality of optical surfaces perpendicular to the emergent light optical axis of said luminescent element, and outgoing light extracting means for extracting a light beam from the emitted luminous flux guided to the optical disk, and the outgoing light extracting means is a diffraction grating formed on one of the optical surfaces inclined with respect to the emergent light optical axis.

11. An optical pickup apparatus according to claim 6, wherein said integrated optical means has an optical thin film disposed on an external surface where an inclined joint surface appears, among the surfaces constituting the external configuration thereof.

12. An optical pickup apparatus according to claim 7, wherein said integrated optical means has a diffraction grating, and said diffraction grating is outgoing light extracting means for extracting a light beam from the emitted luminous flux guided to the optical disk.

13. An optical pickup apparatus according to claim 7, wherein said integrated optical means has a plurality of optical surfaces and a diffraction grating therein, and said diffraction grating is formed on one of said optical surfaces.

14. An optical pickup apparatus according to claim 7, wherein said integrated optical means has, therein, a plurality of optical surfaces inclined with respect to an emergent light optical axis of said luminescent element, a plurality of optical surfaces perpendicular to the emergent light optical axis of said luminescent element, and outgoing light extracting means for extracting a light beam from the emitted luminous flux guided to the optical disk, and the outgoing light extracting means is a diffraction grating formed on one of the optical surfaces inclined with respect to the emergent light optical axis.

15. An optical pickup apparatus according to claim 7, wherein said integrated optical means has an optical thin film disposed on an external surface where an inclined joint surface appears, among the surfaces constituting the external configuration thereof.

16. An optical disk system employing the optical pickup apparatus according to any one of claim 1 to claim 11 and 12 to 15.

17. An apparatus for detecting optical power, said apparatus comprising:

a various-purpose luminescent element;

integrated optical means for guiding an emitted luminous flux of the luminescent element to an optical disk and for separating reflected light from said optical disk;

light receiving means for receiving light and converting it into an electrical signal; and coupling means for retaining a positional relationship among said luminescent element, said integrated optical means, and said light receiving means, wherein said integrated optical means includes outgoing light extracting means for extracting a part of the light in an area around an emitted luminous flux guided to said optical disk, and the optical power of said luminescent element is detected on the basis of the light extracted by said outgoing light extracting means.

18. An optical power detecting method in an apparatus comprising:

a various-purpose luminescent element;

integrated optical means for guiding an emitted luminous flux of the luminescent element to an optical disk and for separating reflected light from the optical disk;

light receiving means for receiving light and converting it into an electrical signal; and coupling means for retaining a positional relationship among the luminescent element, the integrated optical means, and the light receiving means, wherein the integrated optical means includes outgoing light extracting means for extracting a part of the light of the emitted luminous flux guided to the optical disk, the part of the light being in an area that does not contribute to reproduction and recording, and the detection of the optical power proportionate to the luminescent power of the luminescent element is performed by detecting the light, which has been extracted by the outgoing light extracting means, by light receiving means.

19. A method of assembling an optical pickup apparatus having a various-purpose luminescent element, integrated optical means for guiding an emitted luminous flux of the luminescent element to an optical disk and for separating reflected light from the optical disk, light receiving means for receiving light and converting it into an electrical signal, and coupling means for retaining a positional relationship among the luminescent element, the integrated optical means, and the light receiving means, the method comprising the steps of:

adjusting a first optical axis so as to align the optical axes of said luminescent element and said integrated optical means, and adjusting a second optical axis so as to align the optical axes of said integrated optical means and said light receiving means via said coupling means, wherein said luminescent element and said integrated optical means are fixed by the step of adjusting the first optical axis, and said luminescent element, the coupling means, and said light receiving means are fixed by the step of adjusting said second optical axis.

20. A method for assembling an optical pickup apparatus according to claim 19, wherein said integrated optical means is formed by:

a first integrating step for depositing beforehand an optical thin film on a light guiding member composed of parallel plates;

a second integrating step for joining a predetermined number of said light guiding members with the optical thin films deposited thereon;

a third integrating step for cutting the joined light guiding members at an angle with respect to the surfaces with the optical thin films deposited thereon after the second integrating step;

a fourth integrating step for joining another light guiding member with the optical thin film deposited thereon after the third integrating step; and a fifth integrating step for cutting the another light guiding member perpendicularly to the another light guiding member after the fourth integrating step.

21. An optical pickup apparatus comprising:
a various-purpose luminescent element;
integrated optical means for guiding an emitted luminous flux of said luminescent element to an optical disk and for separating reflected light from said optical disk;
light receiving means for receiving light and converting it into an electrical signal; and
coupling means for retaining a positional relationship among said luminescent element, said integrated optical means, and said light receiving means, wherein
a projection area of said integrated optical means in the direction of the emitted luminous flux is smaller than the projection area of said luminescent element in the direction of the emitted luminous flux, and
an inside diameter of said coupling means is larger than an external configuration of said luminescent element.

22. An optical pickup apparatus comprising:
a luminescent element for sealing a laser element by a stem and an envelope and further having an exit port of luminous flux provided on said envelope;
integrated optical means for guiding said luminous flux of said luminescent element to an optical disk and for separating reflected light from the optical disk and further bonded directly to said envelope by adhesion so as to seal the exit port of the envelope;
light receiving means for receiving light and converting it into an electrical signal; and
coupling means for retaining a positional relationship among said luminescent element, said integrated optical means, and said light receiving means, wherein
a projection area of said integrated optical means in the direction of the emitted luminous flux is smaller than the projection area of said luminescent element in the direction of the emitted luminous flux,
an inside diameter of said coupling means is larger than an external configuration of said luminescent element, and
a position of said coupling means can be adjusted with respect to said luminescent element.

23. An optical pickup apparatus comprising:
a luminescent element for sealing a laser element by a stem and an envelope and further having an exit port of luminous flux provided on said envelope;
integrated optical means for guiding said luminous flux of said luminescent element to an optical disk and for separating reflected light from the optical disk and further bonded directly to said envelope by adhesion so as to seal the exit port of the envelope;
light receiving means for receiving light and converting it into an electrical signal; and
coupling means for retaining a positional relationship among said luminescent element, said integrated optical means, and said light receiving means, wherein
a projection area of said integrated optical means in the direction of the emitted luminous flux is smaller than the projection area of said luminescent element in the direction of the emitted luminous flux, and
an inside diameter of said coupling means is larger than an external configuration of said luminescent element.

24. An apparatus for detecting optical power, said apparatus comprising:
a luminescent element for sealing a laser element by a stem and an envelope and further having an exit port of luminous flux provided on said envelope;
integrated optical means for guiding said luminous flux of said luminescent element to an optical disk and for separating reflected light from the optical disk and further bonded directly to said envelope by adhesion so as to seal the exit port of the envelope;
light receiving means for receiving light and converting it into an electrical signal; and
coupling means for retaining a positional relationship among said luminescent element, said integrated optical means, and said light receiving means, wherein
said integrated optical means includes outgoing light extracting means for extracting a part of the light in an area around an emitted luminous flux guided to said optical disk, and
the optical power of said luminescent element is detected on the basis of the light extracted by said outgoing light extracting means.

25. A method of assembling an optical pickup apparatus having a luminescent element for sealing a laser element by a stem and an envelope and further having an exit port of luminous flux provided on said envelope, integrated optical means for guiding said luminous flux of said luminescent element to an optical disk and for separating reflected light from the optical disk and further bonded directly to said envelope by adhesion so as to seal the exit port of the envelope, light receiving means for receiving light and converting it into an electrical signal, and coupling means for retaining a positional relationship among the luminescent element, the integrated optical means, and the light receiving means, the method comprising the steps of:

adjusting a first optical axis so as to align the optical axes of said luminescent element and said integrated optical means, and adjusting a second optical axis so as to align the optical axes of said integrated optical means and said light receiving means via said coupling means, wherein said luminescent element and said integrated optical means are fixed by the step of adjusting the first optical axis, and said luminescent element, the coupling means, and said light receiving means are fixed by the step of adjusting said second optical axis.

* * * * *